(12) United States Patent
Peng et al.

(10) Patent No.: US 10,797,280 B2
(45) Date of Patent: Oct. 6, 2020

(54) BATTERY MODULE

(71) Applicant: CONTEMPORARY AMPEREX TECHNOLOGY CO., LIMITED, Ningde (CN)

(72) Inventors: Menglong Peng, Ningde (CN); Yongjun Tong, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 178 days.

(21) Appl. No.: 16/112,626

(22) Filed: Aug. 24, 2018

(65) Prior Publication Data

US 2019/0088911 A1   Mar. 21, 2019

(30) Foreign Application Priority Data

Sep. 21, 2017  (CN) .................... 2017 2 1218440 U

(51) Int. Cl.
*H01M 2/10* (2006.01)
*H01M 2/26* (2006.01)

(52) U.S. Cl.
CPC ....... *H01M 2/1016* (2013.01); *H01M 2/1077* (2013.01); *H01M 2/26* (2013.01); *H01M 2220/20* (2013.01)

(58) Field of Classification Search
CPC .............................. H01M 2/1016; H01M 2/26
See application file for complete search history.

(56) References Cited

U.S. PATENT DOCUMENTS

2011/0200862 A1*  8/2011  Kurosawa ........... H01M 2/1016
                                                      429/120
2018/0019508 A1*  1/2018  Lee ......................... H01M 2/10

FOREIGN PATENT DOCUMENTS

| CN | 104247084 A | 12/2014 |
| CN | 104488127 A | 4/2015 |
| CN | 102687310 B | 1/2016 |

* cited by examiner

*Primary Examiner* — Carlos Barcena
(74) *Attorney, Agent, or Firm* — Morgan, Lewis & Bockius LLP

(57) ABSTRACT

The present disclosure provides a battery module, which comprises battery units and two side plates. Each battery unit comprises: at least one pouch-type secondary battery; and a fixture securely mounting the at least one pouch-type secondary battery. The two side plates are respectively positioned at two ends of the battery units in a length direction. A first engaging portion is formed between the fixtures of every two adjacent battery units at each end in the length direction. Each side plate has second engaging portions, each second engaging portion is engaged with the corresponding first engaging portion to securely connect each side plate and the every two adjacent battery units, therefore the force of each battery unit received when the battery module is impacted or vibrated is effectively and uniformly dispersed and transferred to the side plates, which improves the structural strength and reliability of the battery module.

10 Claims, 6 Drawing Sheets

BATTERY MODULE

REFERENCE TO RELATED APPLICATIONS

The present application claims priority to Chinese patent application No. CN201721218440.X, filed on Sep. 21, 2017, which is incorporated herein by reference in its entirety.

FIELD OF THE PRESENT DISCLOSURE

The present disclosure relates to the field of battery technology, and particularly relates to a battery module.

BACKGROUND OF THE PRESENT DISCLOSURE

Secondary batteries have various forms. According to the type of the case, the secondary batteries may be divided into the pouch-type secondary battery and the can-type secondary battery. The case of the pouch-type secondary battery is made of a laminated sheet including polymer layers and a metal layer. The case of the can-type secondary battery generally is composed of a metal shell and a metal cap plate.

At present, the battery module using the pouch-type secondary batteries is praised in power battery industry due to its advantages, such as high energy density, high assembling efficiency, high flexibility and the like, and becomes the power battery commonly used in electric vehicles. The battery module using pouch-type secondary batteries is formed by placing a certain number of pouch type secondary batteries in a box formed by the process of splicing, and in order to increase the energy density and assembling efficiency, the box is generally made of engineering plastics having a low-quality, but the strength of the engineering plastics is weaker than that of the general metal material.

The pouch-type secondary battery in the battery module using pouch-type secondary batteries is generally thin in thickness and has a rectangular block shape, and the electrode tabs respectively protrudes from two ends of the pouch-type secondary battery. In the driving of the electric vehicle, due to random vibration and impact, a relative shaking between the pouch-type secondary batteries may occur, which damages the electrode tabs of the pouch-type secondary batteries, and the inertia force of each pouch-type secondary battery is transferred to the pouch-type secondary battery at the outermost through the adjacent pouch-type secondary battery, finally the inertia force of all the pouch-type secondary batteries is concentrated on a local region of the box, which easily results in the problem of rupture and failure of the box formed by splicing and the breaking up of the battery module, and makes the reliability of the battery module reduced.

In order to solve the above problem, the technical person in the industry generally locks the supporting frames of all the pouch-type secondary batteries by a plurality of long bolts and fixes them on the end plates made of metal. However, this method requires many assembling processes and even requires designing dedicated tool, which makes the cost higher, the weight of the battery module heavier and the energy density reduced greatly.

SUMMARY OF THE PRESENT DISCLOSURE

In view of the problem existing in the background, an object of the present disclosure is to provide a battery module, the structure of the battery module is simple, the assembling of the battery module is convenient, the force of each battery unit received can be effectively and uniformly dispersed and transferred to the side plates for fixing the battery units, the structural strength and the reliability of the battery module are improved.

In order to achieve the above object, the present disclosure provides a battery module, which comprises a plurality of battery units and two side plates. The plurality of battery units are arranged side by side in a thickness direction, each battery unit comprises: at least one pouch-type secondary battery; and a fixture securely mounting the at least one pouch-type secondary battery. The two side plates are respectively positioned at two ends of the plurality of battery units in a length direction. A first engaging portion is formed between the fixtures of every two adjacent battery units at each end in the length direction. Each side plate has a plurality of second engaging portions, each second engaging portion is engaged with the corresponding first engaging portion to securely connect each side plate and the every two adjacent battery units.

The present disclosure has the following beneficial effects: in the battery module according to the present disclosure, the first engaging portion is formed between the fixtures of every two adjacent battery units, and each second engaging portion of each side plate is engaged with the corresponding first engaging portion to securely connect each side plate and the every two battery units, therefore the force of each battery unit received when the battery module is impacted or vibrated may be effectively and uniformly dispersed and transferred to the side plates positioned at two ends in the length direction, which improves the structural strength and reliability of the battery module. In addition, the first engaging portion formed between the fixtures of every two adjacent battery units is directly engaged with the corresponding second engaging portion of each side plate to securely connect each side plate and the every two battery units, which makes the assembling of the battery module simple and convenient, and does not need to design dedicated tool, decreases the cost of the battery module greatly and reduces the weight of the assembled battery module.

Figure 1:
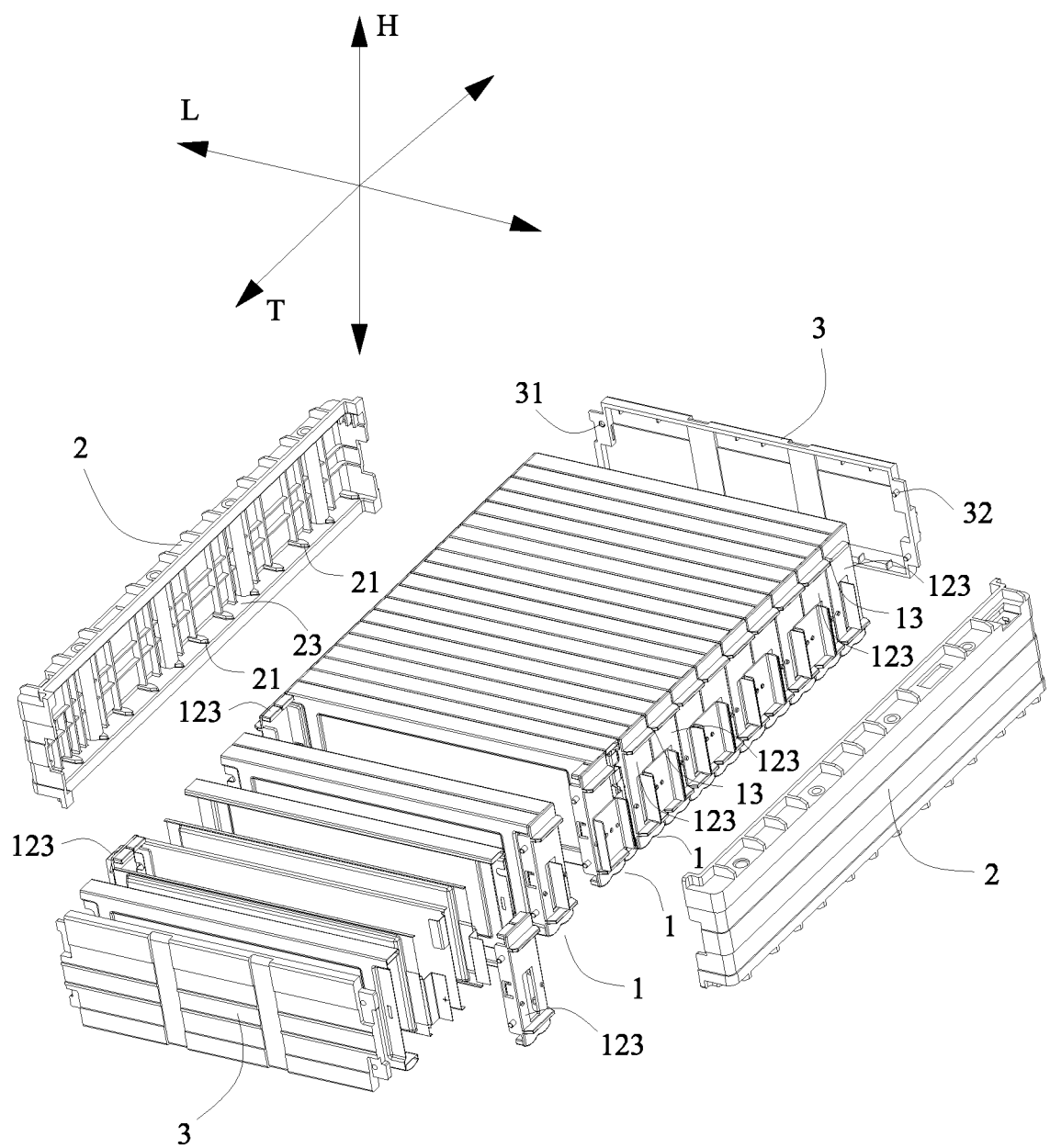
FIG. 1 is an exploded perspective view of a battery module according to the present disclosure viewed from an angle.

Reference numerals are represented as follows:

1 battery unit 11 pouch-type secondary battery
111 electrode tab
12 fixture
121 first cover plate
1211 first edge
1212 first latching groove
122 second cover plate
1221 second edge
1222 second latching groove
123 bracket
1231 body portion
1232 supporting portion
1233 extending portion
12331 draft angle
1234 first through hole
1235 second through hole
1236 first column
1237 first latching protrusion
1238 second latching protrusion
124 middle plate
13 first engaging portion
2 side plate
21 second engaging portion
22 first inner platform surface
23 second inner platform surface
3 end plate
31 mounting hole
32 guide column
T thickness direction
H height direction
L length direction

DETAILED DESCRIPTION

Hereinafter a battery module according to the present disclosure will be described in detail in combination with the figures.

Referring to FIG. 1 to FIG. 10, a battery module according to the present disclosure comprises a plurality of battery units 1 and two side plates 2.

The plurality of battery units 1 are arranged side by side in a thickness direction T, each battery unit 1 comprises: at least one pouch-type secondary battery 11; and a fixture 12 securely mounting the at least one pouch-type secondary battery 11. The two side plates 2 are respectively positioned at two ends of the plurality of battery units 1 in a length direction L.

A first engaging portion 13 is formed between the fixtures 12 of every two adjacent battery units 1 at each end in the length direction L. Each side plate 2 has a plurality of second engaging portions 21, each second engaging portion 21 is engaged with the corresponding first engaging portion 13 to securely connect each side plate 2 and the every two adjacent battery units 1.

In the battery module according to the present disclosure, the first engaging portion 13 is formed between the fixtures 12 of every two adjacent battery units 1, and each second engaging portion 21 of each side plate 2 is engaged with the corresponding first engaging portion 13 to securely connect each side plate 2 and the every two battery units 1, therefore the force of each battery unit 1 received when the battery module is impacted or vibrated may be effectively and uniformly dispersed and transferred to the side plates 2 positioned at two ends in the length direction L, which improves the structural strength and reliability of the battery module. In addition, the first engaging portion 13 formed between the fixtures 12 of every two adjacent battery units 1 is directly engaged with the corresponding second engaging portion 21 of each side plate 2 to securely connect each side plate 2 and the every two battery units 1, which makes the assembling of the battery module simple and convenient, and does not need to design dedicated tool, decreases the cost of the battery module greatly and reduces the weight of the assembled battery module.

Figure 2:
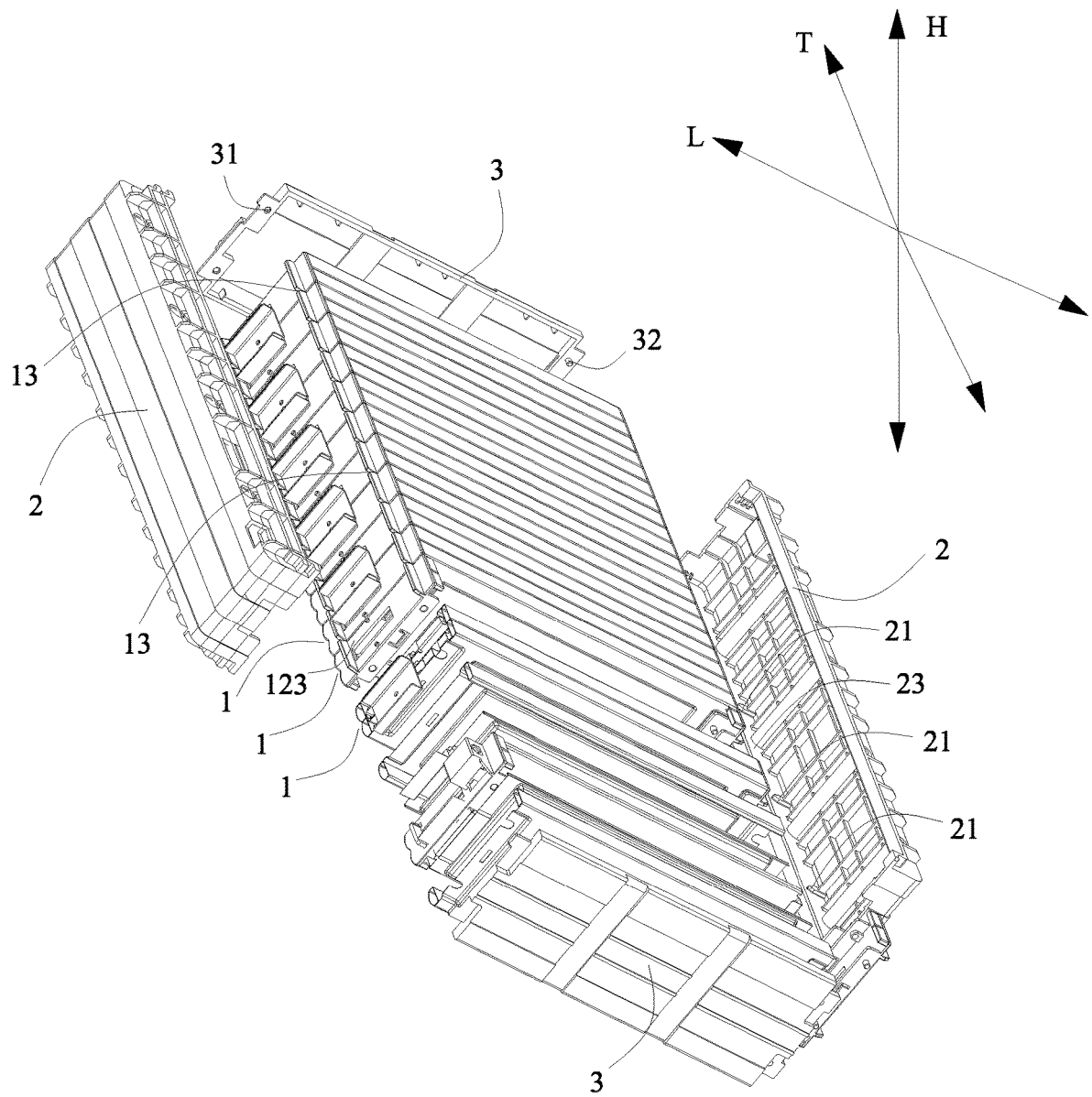
FIG. 2 is an exploded perspective view of the battery module according to the present disclosure viewed from another angle.

Referring to FIG. 1 and FIG. 2, each first engaging portion 13 can be a recessed groove, and the second engaging portion 21 can be a protrusion engaged with the recessed groove by concave-convex fit. Or each first engaging portion 13 can be a protrusion, and the second engaging portion 21 can be a recessed groove engaged with the protrusion by concave-convex fit. In other words, each first engaging portion 13 and the corresponding second engaging portion 21 can use the concave-convex fit to securely assemble. A shape of the recessed groove can be triangle (as shown in FIG. 1 and FIG. 2), trapezoidal, rectangular or U-shaped, and a shape of the protrusion is consistent with the shape of the recessed groove.

Figure 10:
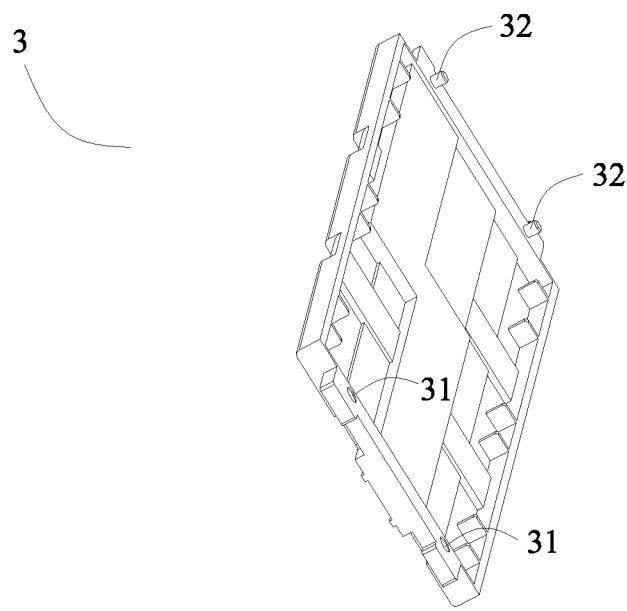
FIG. 10 is a perspective view of an end plate of FIG. 1.

Referring to FIG. 1, FIG. 2 and FIG. 10, the battery module may further comprise: two end plates 3 respectively positioned at two ends of the plurality of battery units 1 in the thickness direction T.

Figure 3:
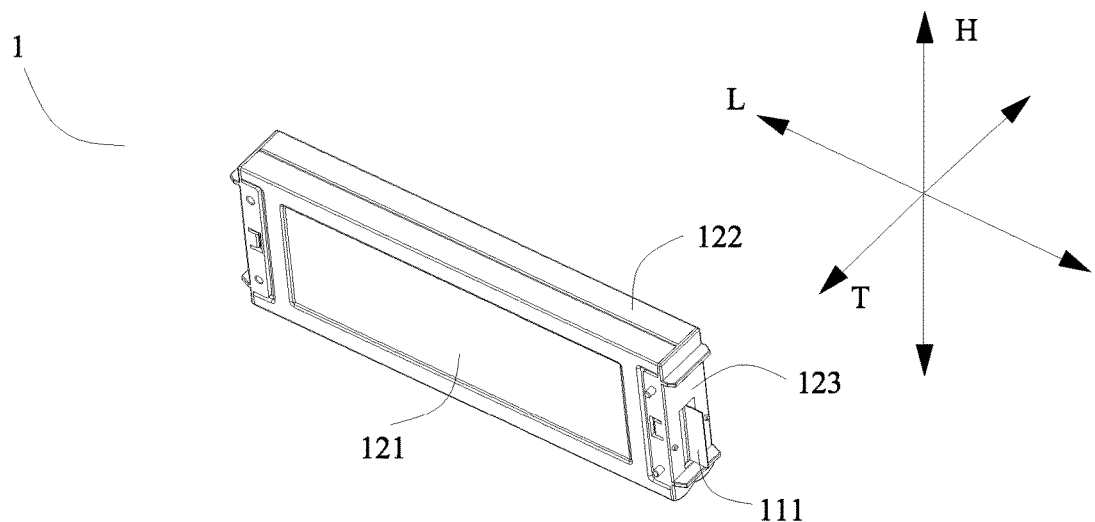
FIG. 3 is a perspective view of a battery unit of FIG. 1.
Figure 4:
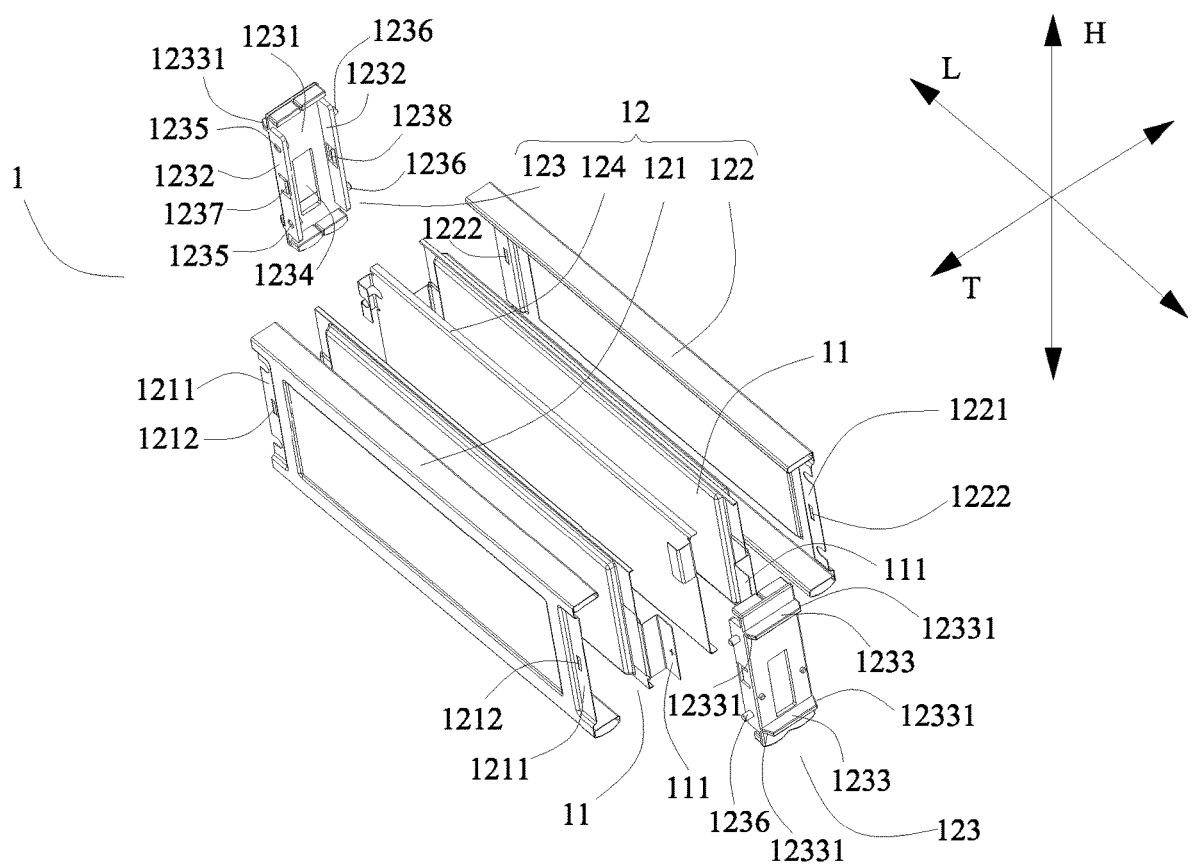
FIG. 4 is an exploded view of FIG. 3.

Referring to FIG. 3 and FIG. 4, each fixture 12 may comprise: a first cover plate 121; a second cover plate 122 facing the first cover plate 121 in the thickness direction T; and two brackets 123 respectively positioned at two sides of the first cover plate 121 and the second cover plate 122 in the length direction L and detachably fixed to the first cover plate 121 and the second cover plate 122. At least two pouch-type secondary batteries 11 are received in a receiving space formed by the first cover plate 121, the second cover plate 122 and the two brackets 123. As a result, each battery unit 1 can be regarded as a can-type secondary battery, which can accelerate the assembling of the battery module and improve production efficiency greatly. In addition, the battery module assembled by battery units 1 is similar to a battery module assembled by can-type secondary batteries, so that the resources of research, development and production (such as the equipments of the production line) can be shared, thereby reducing the waste of resources greatly.

In order to dissipate heat, both the first cover plate 121 and the second cover plate 122 may be thermal conductive plates. The thermal conductive plate may be a metal plate, and the metal plate may be but not limited to an aluminum plate. Both the two brackets 123 may be plastic members, and the plastic member has excellent formability during the process of molding and excellent elasticity during the process of using.

Further referring to FIG. 4, each fixture 12 may further comprise: a middle plate 124 positioned between every two adjacent pouch-type secondary batteries 11. Based on the number of the pouch-type secondary batteries 11 received in the receiving space formed by the first cover plate 121, the second cover plate 122 and the two brackets 123, the number of the middle plates 124 can be selected properly. The middle plate 124 may also be thermal conductive plate to facilitate the heat dissipation of each pouch-type secondary battery 11.

Referring to 3 and FIG. 4, each pouch-type secondary battery 11 has two electrode tabs 111 opposite in polarity. Referring to FIG. 4, each bracket 123 may have: a body portion 1231 provided with a first through hole 1234, the first through hole 1234 passes through the body portion 1231 in the length direction L and allows the electrode tab 111 of the corresponding pouch-type secondary battery 11 to pass through; two supporting portions 1232 formed on the body portion 1231, spaced apart from each other in the thickness direction T and extending toward an inner side of the body portion 1231; and two extending portions 1233 formed on the body portion 1231, spaced apart from each other in a height direction H and extending toward an outer side of the body portion 1231. The two adjacent extending portions 1233 of every two adjacent brackets 123 in the thickness direction T are arranged side by side and together form the first engaging portion 13 (as shown in FIG. 1 and FIG. 2).

Further referring to FIG. 4, two ends of each extending portion 1233 of each bracket 123 in the thickness direction T are provided with draft angles 12331. The two adjacent draft angles 12331 of every two adjacent extending portions 1233 arranged side by side in the thickness direction T together form the first engaging portion 13. Herein, the "draft angle 12331" actually is a notch, that is a chamfer-like structure, so that a plurality of extending portions 1233 arranged side by side in the thickness direction T are spliced and form a concave tooth structure (a concave teeth is one first engaging portion 13), correspondingly, the second engaging portions 21 of each side plate 2 form a convex tooth structure, and the first engaging portions 13 and the second engaging portions 21 respectively mesh with each other to complete the assembling of each battery unit 1 and each side plate 2.

Figure 5:
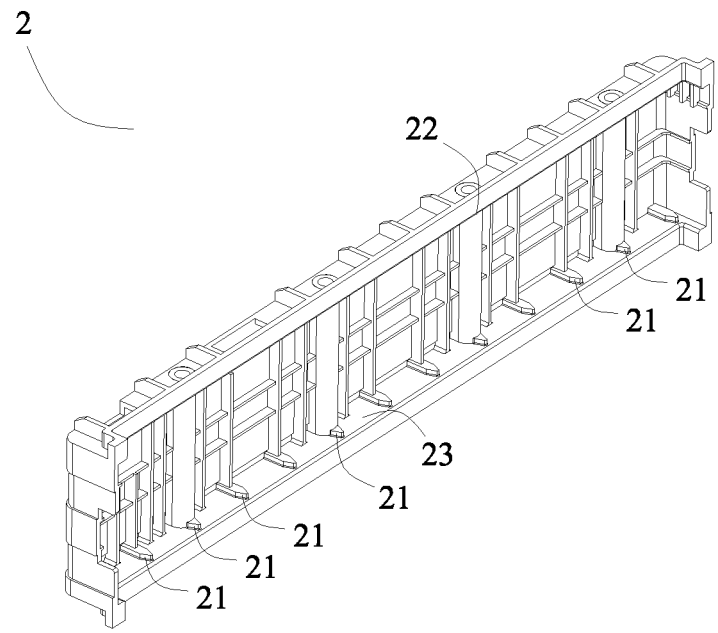
FIG. 5 is a perspective view of a side plate of FIG. 1 viewed from an angle.
Figure 6:
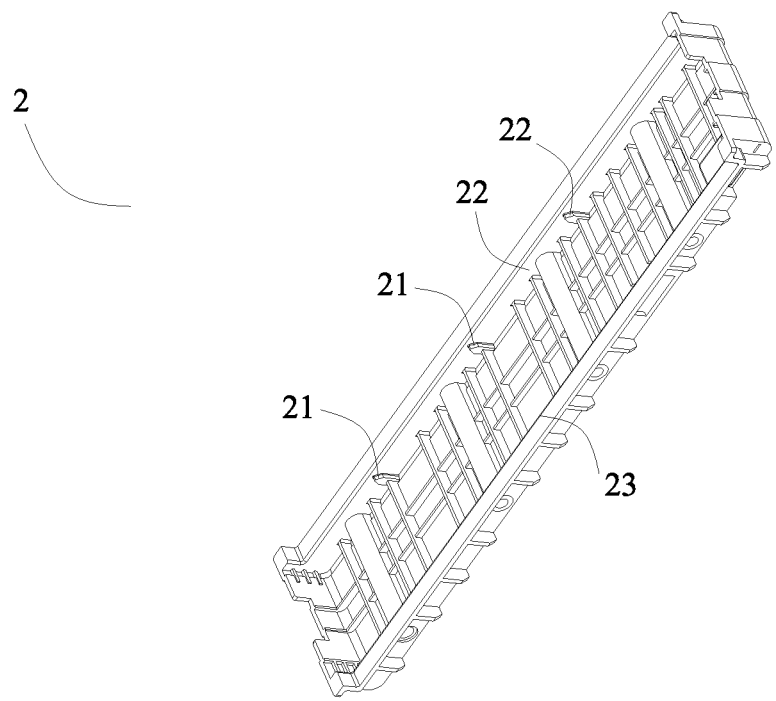
FIG. 6 is a perspective view of the side plate of FIG. 1 viewed from another angle.
Figure 7:
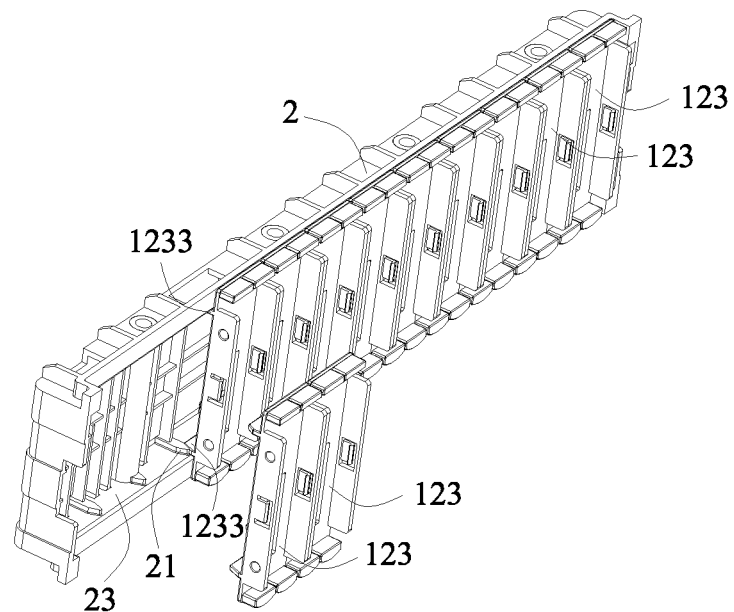
FIG. 7 is an assembling perspective view of the side plate and brackets of the battery units of the battery module according to the present disclosure, in which some of the brackets are not completely mounted on the side plate for sake of clearness.
Figure 8:
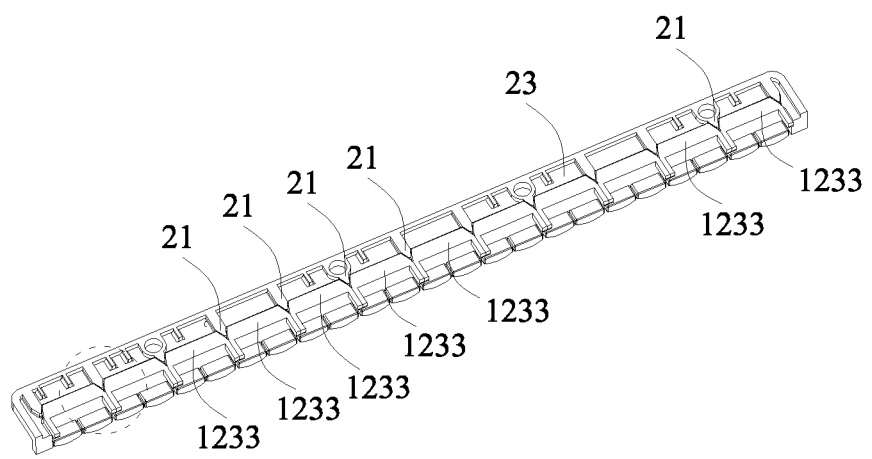
FIG. 8 is a mounting relationship schematic view between second engaging portions of the side plate and extending portions of the brackets of FIG. 7.
Figure 9:
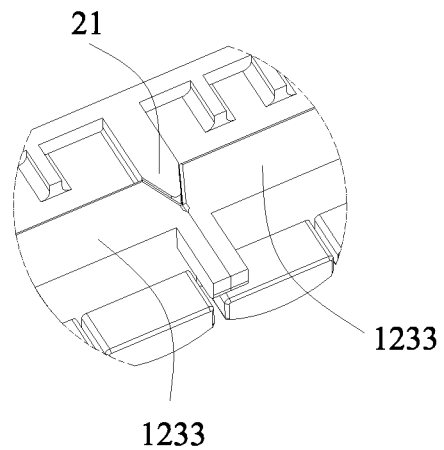
FIG. 9 is an enlarged view of FIG. 8 indicated by a circle part.

Referring to FIG. 5 and FIG. 6, each side plate 2 may further have: a first inner platform surface 22 pressing one extending portion 1233 of each bracket 123 downwardly; and a second inner platform surface 23 pressing the other one extending portion 1233 of each bracket 123 upwardly. When each side plate 2 is assembled with all the battery units 1, the second engaging portion 21 of each side plate 2 is inserted into the corresponding first engaging portion 13 formed by the extending portions 1233 of the brackets 123 of every two adjacent battery units 1, the first inner platform surface 22 of each side plate 2 contacts an upper surface of the one extending portion 1233 of each bracket 123 and presses the extending portion 1233 downwardly, and the second inner platform surface 23 contacts a lower surface of the other one extending portion 1233 of each bracket 123 and presses the extending portion 1233 upwardly, so that the two side plates 2 clamp and fix each battery unit 1.

The second engaging portions 21 of each side plate 2 may be formed on the first inner platform surface 22 and/or the second inner platform surface 23. Preferably, referring to FIG. 5 and FIG. 6, the second engaging portions 21 are formed on the first inner platform surface 22 and the second inner platform surface 23, such an arrangement makes two ends of each side plate 2 in the height direction H securely connect with each battery unit 1, which plays a good fixing effect.

Referring to FIG. 4, each bracket 123 may further have: a second through hole 1235 passing through one supporting portion 1232 of each bracket 123; and a first column 1236 formed on the other one supporting portion 1232 of each bracket 123. The first column 1236 of one of every two adjacent brackets 123 in the thickness direction T is inserted into the second through hole 1235 of the other one of every two adjacent brackets 123 in the thickness direction T to assemble every two adjacent battery units 1. Here, the first column 1236 and the second through hole 1235 can be in interference fit to facilitate the assembling of every two adjacent battery units 1, which improves the assembling efficiency of the battery module.

Referring to FIG. 1, FIG. 2 and FIG. 10, each end plate 3 may have: a mounting hole 31 formed at one end of each end plate 3 in the length direction L and allowing the corresponding first column 1236 of one bracket 123 which is outermost in the thickness direction T to insert therein; and a guide column 32 formed at the other end of each end plate 3 in the length direction L and inserting the corresponding second through hole 1235 of one bracket 123 which is outermost in the thickness direction T. Here, the mounting holes 31 of each end plate 3 and the corresponding first columns 1236 of the outermost bracket 123 can be in interference fit, the guide columns 32 of each end plate 3 and the corresponding second through holes 1235 of the outermost bracket 123 can also be in interference fit, and the connection type of interference fit is simple and quick, which improves the assembling efficiency of the battery module greatly.

Referring to FIG. 4, the first cover plate 121 may have two first edges 1211 respectively positioned at two ends of the first cover plate 121 in the length direction L, and each first edge 1211 is provided with a first latching groove 1212 passing through the first edge 1211 in the thickness direction T. The second cover plate 122 may have two second edges 1221 respectively positioned at two ends of the second cover plate 122 in the length direction L, and each second edge 1221 is provided with a second latching groove 1222 passing through the second edge 1221 in the thickness direction T. Each bracket 123 is provided with a first latching protrusion 1237 and a second latching protrusion 1238 respectively protruding inwardly from two sides of the bracket 123 in the thickness direction T, and the first latching protrusion 1237 and the second latching protrusion 1238 are respectively formed in the corresponding supporting portions 1232 of each bracket 123, and the first latching protrusion 1237 is latched with the first latching groove 1212, the second latching protrusion 1238 is latched with the second latching groove 1222. The first latching protrusion 1237 may be cantilevered, and the second latching protrusion 1238 may also be cantilevered.

What is claimed is:
1. A battery module, comprising:
  a plurality of battery units arranged side by side in a thickness direction, each battery unit comprising:
    at least one pouch-type secondary battery; and
    a fixture securely mounting the at least one pouch-type secondary battery;
  two side plates respectively positioned at two ends of the plurality of battery units in a length direction;
  wherein
  a first engaging portion is formed between the fixtures of every two adjacent battery units at each end in the length direction;
  each side plate has a plurality of second engaging portions, each second engaging portion is engaged with the corresponding first engaging portion to securely connect each side plate and the every two adjacent battery units;
  each fixture comprises:
    a first cover plate;
    a second cover plate facing the first cover plate in the thickness direction; and
    two brackets respectively positioned at two sides of the first cover plate and the second cover plate in the length direction and detachably fixed to the first cover plate and the second cover plate;

wherein at least two pouch-type secondary batteries are received in a receiving space formed by the first cover plate, the second cover plate and the two brackets.

2. The battery module according to claim 1, wherein
each first engaging portion is a recessed groove, and the second engaging portion is a protrusion engaged with the recessed groove by concave-convex fit; or
each first engaging portion is a protrusion, and the second engaging portion is a recessed groove engaged with the protrusion by concave-convex fit.

3. The battery module according to claim 1, wherein the battery module further comprises: two end plates respectively positioned at two ends of the plurality of battery units in the thickness direction.

4. The battery module according to claim 1, wherein
each pouch-type secondary battery has two electrode tabs opposite in polarity;
each bracket has:
a body portion provided with a first through hole, the first through hole passes through the body portion in the length direction and allows the electrode tab of the corresponding pouch-type secondary battery to pass through;
two supporting portions formed on the body portion, spaced apart from each other in the thickness direction and extending toward an inner side of the body portion; and
two extending portions formed on the body portion, spaced apart from each other in a height direction and extending toward an outer side of the body portion;
the two adjacent extending portions of every two adjacent brackets in the thickness direction are arranged side by side and together form the first engaging portion.

5. The battery module according to claim 4, wherein two ends of each extending portion of each bracket in the thickness direction are provided with draft angles, the two adjacent draft angles of every two adjacent extending portions arranged side by side in the thickness direction together form the first engaging portion.

6. The battery module according to claim 4, wherein each side plate further has:
a first inner platform surface pressing one extending portion of each bracket downwardly; and
a second inner platform surface pressing the other one extending portion of each bracket upwardly.

7. The battery module according to claim 6, wherein the second engaging portions of each side plate are formed on the first inner platform surface and/or the second inner platform surface.

8. The battery module according to claim 4, wherein each bracket further has:
a second through hole passing through one supporting portion of each bracket; and
a first column formed on the other one supporting portion of each bracket;
the first column of one of every two adjacent brackets in the thickness direction is inserted into the second through hole of the other one of every two adjacent brackets in the thickness direction to assemble every two adjacent battery units.

9. The battery module according to claim 8, wherein each end plate has:
a mounting hole formed at one end of each end plate in the length direction and allowing the corresponding first column of one bracket which is outermost in the thickness direction to insert therein; and
a guide column formed at the other end of each end plate in the length direction and inserting the corresponding second through hole of one bracket which is outermost in the thickness direction.

10. The battery module according to claim 4, wherein
the first cover plate has two first edges respectively positioned at two ends of the first cover plate in the length direction, and each first edge is provided with a first latching groove passing through the first edge in the thickness direction;
the second cover plate has two second edges respectively positioned at two ends of the second cover plate in the length direction, and each second edge is provided with a second latching groove passing through the second edge in the thickness direction;
each bracket is provided with a first latching protrusion and a second latching protrusion respectively protruding inwardly from two sides of the bracket in the thickness direction, and the first latching protrusion and the second latching protrusion are respectively formed in the corresponding supporting portions of each bracket, and the first latching protrusion is latched with the first latching groove, the second latching protrusion is latched with the second latching groove.

* * * * *